United States Patent [19]
Tatsumi

[11] 3,709,010
[45] Jan. 9, 1973

[54] METHOD FOR AUTOMATICALLY CONTROLLING THICKNESS OF A WORKPIECE IN A ROLLING MILL

[75] Inventor: Setsuo Tatsumi, Fukuyama-shi, Hiroshima-ken, Japan

[73] Assignee: Nippon Kokan Kabushiki Kaisha, Tokyo, Japan

[22] Filed: Dec. 17, 1970

[21] Appl. No.: 99,086

Related U.S. Application Data

[63] Continuation-in-part of Ser. No. 687,956, Nov. 27, 1967, abandoned.

[30] Foreign Application Priority Data

Nov. 26, 1966 Japan ........................... 41/77256

[52] U.S. Cl. .............................................. 72/8, 72/20
[51] Int. Cl. ................................................. B21b 37/08
[58] Field of Search ....................... 72/6, 19, 20, 16

[56] References Cited

UNITED STATES PATENTS 3,394,566  7/1968  O'Brien ................................... 72/8
3,518,858  7/1970  Kamata .................................. 72/19
3,416,341  12/1968  Dey et al. ............................. 72/21 X
3,574,279  4/1971  Smith, Jr. ................................. 72/7

*Primary Examiner*—Milton S. Mehr
*Attorney*—Flynn & Frishauf

[57] ABSTRACT

A method of controlling the shape and thickness of a strip workpiece in a rolling mill wherein an electrical signal is generated representative of a bending pressure applied to the rolls, another electrical signal is generated as a function of a fixed relation between the bending pressure and a constant and still another electrical signal is generated representative of the total force applied on the backup rolls. The signals representative of said fixed relation and of said total force are combined to provide a control signal to vary the rolling load to control the shape and thickness of the workpiece to eliminate the effect of the reaction forces on control of the rolls which otherwise tends to cause production of workpieces which do not meet the desired specifications.

7 Claims, 15 Drawing Figures

METHOD FOR AUTOMATICALLY CONTROLLING THICKNESS OF A WORKPIECE IN A ROLLING MILL

This is a continuation-in-part of application Ser. No. 687,956, filed Nov. 27, 1967, now abandoned.

The present invention relates in general to automatic control of the shape and thickness of a strip-shaped workpiece leaving a rolling mill, and more particularly, to preventing the automatic control system from being sensitive to erroneous parameters.

It is well known in the prior art to control workpiece strip shape, i.e., thickness across the width of the strip. One of the prior art control means utilizes crowned rolls on the premise that non-uniformity of thickness across the whole width of the strip results in elastic deformation of the rolling roll. The basic way to control the strip shape in the above case was to use various properly crowned rolls in accordance with changes of the rolling schedule. In this type of system, it was difficult to achieve the best suitable operation for several reasons, e.g., rolling conditions, rolling lubricants, roll wear, roll heat expansion, roll cooling water and so forth, had effects on the rolling operation.

In recent years, a method has been developed to control the roll crown by means of applying a bending force between rolling rolls, with hydraulic or other suitable force means. Two of the above types of forced bending devices wherein the force is introduced either between backup rolls or between workrolls are well known. According to the present inventors' experiments, using either of the known systems, it has been confirmed that there is a great tendency to provide inaccurate and undesirable results, because the sensor utilized in such systems senses not only the real roll force but also some reaction of the roll bending force through the screw-down unit. The sensor then generates a false output signal which is greater than the real roll force by an amount corresponding to the reaction portion of the forces sensed.

By experimentation, important factors which have led to solving the above problem have been discovered. First, one cannot remove the above sensitivity of the sensor to the reaction forces. Second, there is a certain relation between bending force and rolling load added to the reaction to said bending force.

It is an object of the present invention to prevent an automatic thickness control system from providing erroneous results.

It is a further object of the present invention to provide an improved workpiece shape and thickness control system which substantially reduced the presence of so-called center buckles or wavy edges of the workpiece strip.

SUMMARY OF THE INVENTION

In accordance with the present invention, the relation between bending force and rolling load added to the reaction to said bending force is calculated in advance, and then the calculated value is converted into an electrical signal. The electrical signal is added to the output signal of the above-mentioned sensor to more accurately and stably control workpiece thickness.

Further objects and advantages of the present invention will become apparent from the following detailed description taken with reference to the accompanying drawings in which.

Figure 4:
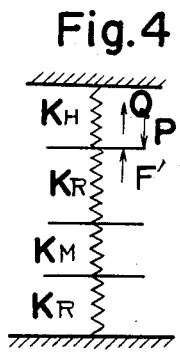
FIG. 4 illustrates a typical model substituting the function of FIG. 3 by a spring unit.

FIGS. 9A–F are diagrams illustrating the development of FIG. 4; and

Figure 10:
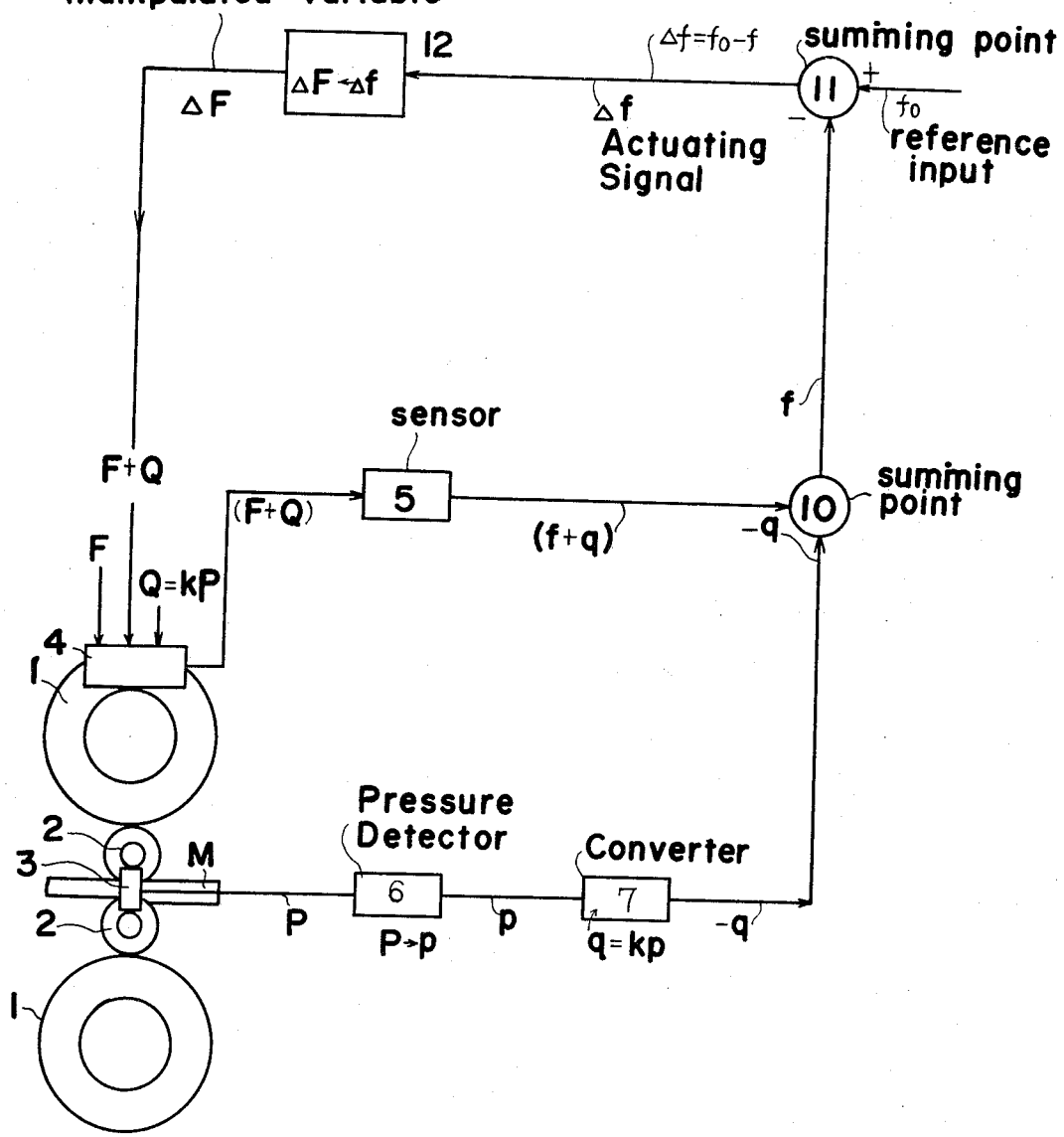

FIG. 10 is a block diagram illustrating the transfer of signals in an embodiment of the present system.

Figure 1:
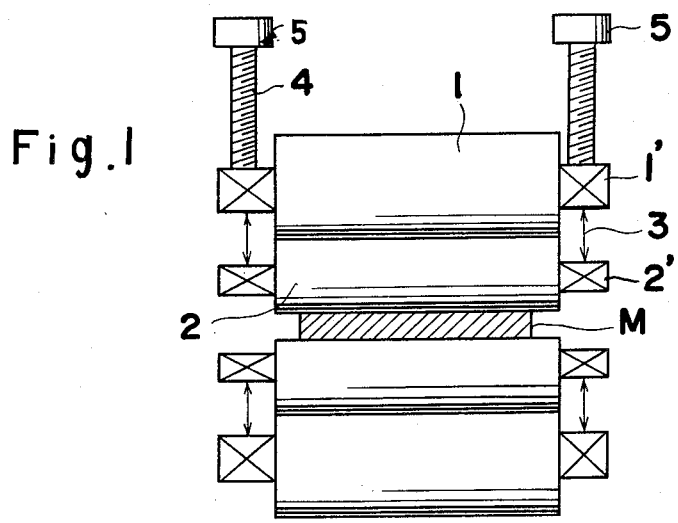
FIG. 1 is a view of an automatic shape and thickness control system for a strip workpiece.

In FIG. 1 there is generally shown an example of a conventional bending force system, which is made to control the crown of work rolls 2 by forcibly bending the work rolls 2 by means of a hydraulic cylinder 3 connected between the chock 1' of backup roll 1 and the chock 2' of work roll 2. It may be easily understood that a sensor 5 of the automatic control system e.g., a load cell or the like, will sense not only the rolling force applied by cylinder 3, but also the reaction force of the roll bending force through the reduction screw 4. This results in the generation of an output signal that erroneously represents a force that is larger than the real rolling force, applied to the rolls. As mentioned previously, the above mentioned erroneous output signal of the sensor causes the automatic thickness control system to provide strips having the incorrect thickness.

Figure 2:
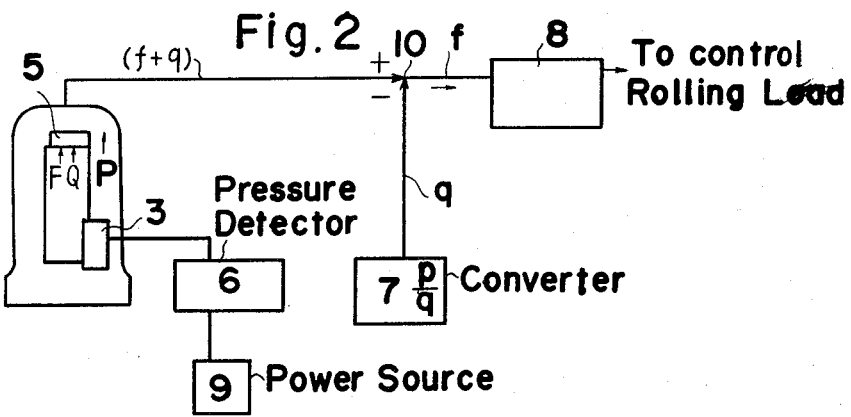
FIG. 2 is a block diagram illustrating the operation of one embodiment of the present invention.

A typical embodiment for carrying out the present invention to overcome the disadvantage is diagrammatically illustrated in FIG. 2. The present invention comprises an oil pressure detector 6 which senses the pressure in hydraulic cylinder 3. Cylinder 3 is connected as shown diagrammatically in FIG. 1. Sensor 5 is connected as shown in FIG. 1. Pressure detector 6 is connected to power source 9. Detector 6 converts the above detected pressure into an electrical value $p$, and a converter 7 is provided which converts the electrical value $p$ into an electrical signal $q$ which is fed to a summing point 10 which also receives the output from the sensor 5. The output of summing point 10 is fed to a control circuit 8 which provides outputs responsive to these inputs to control the thickness of the strip passing through the mill. In FIG. 2, P is the roll bending force of the cylinder 3 and is converted to an electrical signal $p$ by the detector 6; F is the real rolling force applied to the rolls; Q is the force applied to the sensor 5 by the force P of the cylinder 3; and $q$ is the electrical output signal of sensor 5 due to the force Q is applied to it.

The most important factor is that the relation between force P of the bending cylinder 3 and force (Q) applied to the sensor 5 is calculated in advance and is stored in the memory of the converter 7 as an equation, such as:

$$q = kp \ldots \quad (1)$$

where:

$k$ = proportional constant

The converter 7 uses the relationship of equation 1 above to convert its input signal $p$ into an output signal which is equal in magnitude to the value of the signal $q$ appearing in the signal from sensor 5. For convenience, the output of converter 7 is indicated in FIG. 2 as $q$. The output $q$ of converter 7 has a subtractive polarity with respect to the signal $q$ appearing in the output of sensor 5. The present invention need not utilize any special circuitry for generating the appropriate $q$ signal at the output of converter 7. Standard well known circuit networks can be used and applied to utilizing equation 1 in converter 7. It is pointed out that the above mentioned constant $k$ is generally not constant in value. The above P and Q forces values change with the rolling conditions and the type of the workpiece, e.g., size, properties and temperature. Accordingly, the constant $k$ also will have many values which depend on operating conditions. Further, it goes without saying that the constant $k$ is made to change also in accordance with the kind of roll bending device used. The $k$ value is, in advance, calculated on the basis of the rolling schedule and of the rolling resistance of the workpiece, and is set in the memory of the converter 7. The $k$ value may be entered in converter 7 by any well known method, such as, by manual dial, program by punch-card, punched tape, output of an electronic computer and the like.

The above described automatic shape and thickness control system shown in FIG. 2, which utilizes a predetermined relationship between force Q and signals $p$ and $q$, will provide more accurate and stable operation. This will be more easily understood from the following detailed description with regard to the tracing of both the P and Q signals. As mentioned previously, the output signal from the sensor 5 includes the real rolling force and the counter-force of roll bending force. The bending force is proportional to the hydraulic cylinder 3 pressure.

Figure 3:
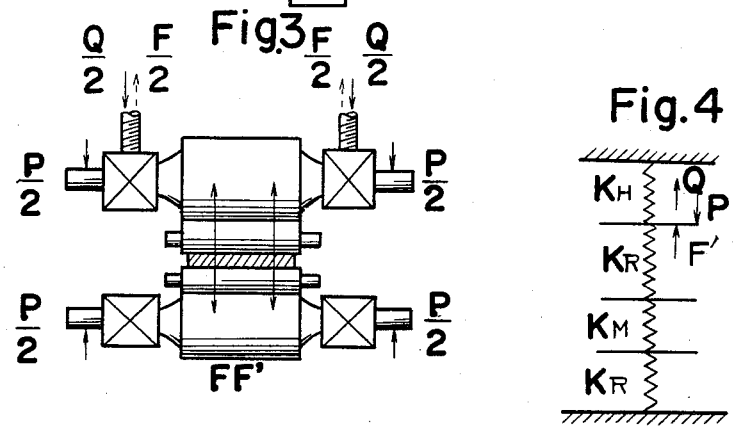
FIG. 3 is a explanatory showing of a bending unit for backup rolls.
Figure 5:
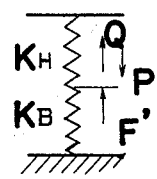
FIG. 5 is more simplified model of FIG. 4.
Figure 9A:
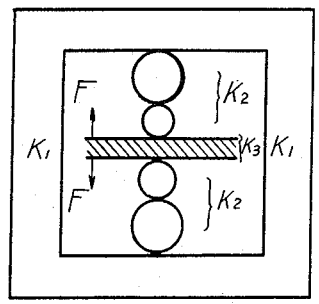

In FIGS. 3–5, there is shown the above relations between the P force and the Q force as a typical model of a backup roll bending device. In FIG. 3, if the pressure P of the roll bending cylinder 3 (not shown in FIG. 3) is applied to the backup roll during rolling with rolling force F, the rolling force F (as measured by sensor 5), will be made to increase by F′ in proportion to a change Q of the force acting on the screw down unit. The relation, at this time, between the forces P and Q may be simulated by a spring unit model as shown in FIG. 4, wherein KH represents a spring constant of the housing including the screw down mechanism, KR represents a spring constant corresponding to the degree of flatness of the workroll and the backup roll, KM represents a unit force required to deform a unit thickness of the material being rolled. KM corresponds to the tangent of the plastic deformation curve of the material being worked on, and is not a constant. It may be, however, in a narrow range, regarded as a constant. The spring unit model of FIG. 4 is developed as follows: FIG. 9A shows a simplified version of a four roll mill, wherein: K1 is the spring constant of the pillers of the rolling mill; K2 is the spring constant representing the deviation of two adjacent rolls; and K3 is the spring constant of the material being rolled.

A further description of the spring constants will be given below.

Figure 9B:
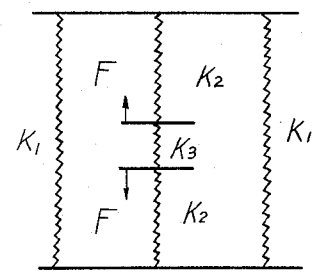

FIG. 9A is further simplified as shown in FIG. 9B.

Figure 9C:
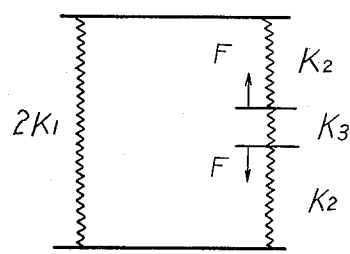

FIG. 9B is further simplified as shown in FIG. 9C by indicating the two springs K1 as a single spring. FIG. 9C may be expressed as shown in FIG. 9D.

Figure 9D:
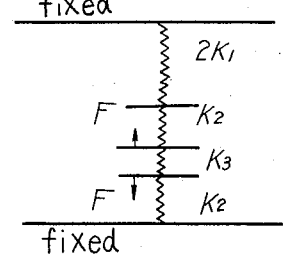

The difference from FIG. 9C to FIG. 9D is that when force "F" is in effect, spring "2K1" changes in the direction of "elongation" in FIG. 9C, and changes in the direction of "contraction" in FIG. 9D. Since the absolute value of "spring force" and "deformation amount" generated in spring "2K1" is the same in FIGS. 9C and 9D, there is mathematically no difference between FIGS. 9C and 9D. The other springs "K2" and "K3" are the same in FIGS. 9C and 9D.

Figure 9E:
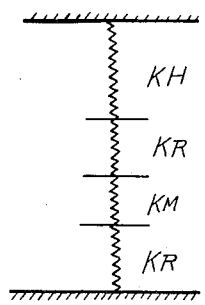

FIG. 9D becomes FIG. 9E if the following relationship is effected:

$$2K1 = KH$$

$$K2 = KR$$

$$K3 = KM$$

Figure 7:
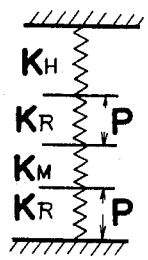
FIG. 7 illustrates a typical model representing the function of FIG. 6 by a spring unit.
Figure 9F:
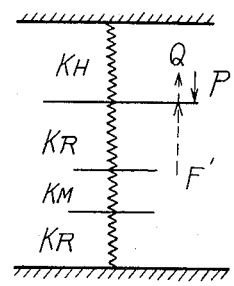

In FIG. 9E, four springs, $KH, KR, KM, KR$, are in a state where a constant contraction force "F" is operative. FIGS. 4 and 7 are arrived at from FIG. 9E as described below. In the case of back up roll bending, the bending force "P" is effective in such a way as to compress springs $KR, KM, KR$ as shown in FIG. 3 so that deviations equivalent to force "Q" in spring $KH$, and to force "F" in springs $KR, KM$ and $KR$ are generated, as shown in FIGS. 9E which will become FIG. 9F. FIG. 9F is the same as FIG. 4.

In FIG. 9F, the spring "KH" is shown as if elongation is taking place. In actuality, the piller of the rolling mill shows "contraction." This is due to the reasons discussed above with respect to the differences between FIGS. 9C and 9D. However, the dynamic effects to the springs are exactly the same. In view of the above, the derivation and application of FIG. 4 should be apparent. FIG. 5 will become then automatically clear.

The above increase in actual rolling force F by F′ due to the roll bending force P may thus be represented as a spring constant model by connecting the three springs of FIG. 4, i.e., $KR, KM$ and $KR$, in series. The relations among the above springs will be apparent from the following equation in which:

$$1/KB = 1/KR + 1/KM + 1/KR \ldots \quad \text{(II)}$$

where, $KB$ represents all three springs connected in series.

Simplifying FIG. 4, on the basis of the above relations, the model of FIG. 5 is obtained. When force P acts as shown in FIG. 5, the force Q that appears in the spring $KH$ causes a displacement in the springs by the amount $x$. Thus:

$$Q = KH \cdot x \ldots \quad \text{(III)}$$

$$F' = KB \cdot x \ldots \quad \text{(IV)}$$

In FIG. 5, force P is regarded as the force being composed of two forces, i.e., $Q$ and $F'$. The following equation is then obtained.

$$P = Q + F' = x(KH + KB) \ldots \quad \text{(V)}$$

and $$x = P/KH + KB \ldots \quad (VI)$$

The above displacement value being considered in connection with equation (III), it will be easily understood that equation (III) may be written in the form as follows:

$$Q = (KH/KH + KB) P. \quad (VII)$$

then, from rearranging equation (II):

$$KB = (KR \cdot KM/2KM + KR). \quad (VIII)$$

Substituting equation (VIII) for (VII), the required proportional constant $k$ then becomes:

$$k = (KH(KR+2KM)/KH \cdot KR + KR \cdot KM + 2KM \cdot KH)(IX)$$

Figure 6:
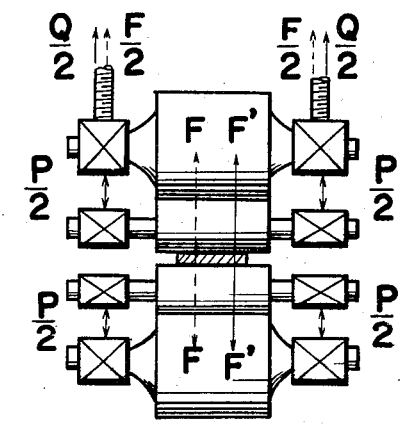
FIG. 6 is an explanatory showing of a bending unit for workrolls.

In FIG. 6, FIG. 7 and FIG. 9, there are shown the above mentioned relations with regard to a workroll bending device. The relation between the forces P and Q is different from that of FIG. 3.

Figure 8:
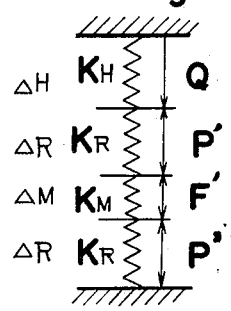
FIG. 8 is further simplified model of FIG. 7.

As shown in FIG. 6 the bending force P works in a direction to tend to separate two rolls contacting with each other. Since this is equivalent to the tensioning of spring $KR$, FIG. 9E is used to derive FIG. 7. Because of the action of force $P$, deviation in forces $Q, P', F', P'$ is simulated in springs $KH, KR, KM$ and $KR$, and the displacement values of $\Delta H, \Delta R, \Delta M,$ and $\Delta R$, of springs $KH, KR, KM$ and $KR$, respectively, are generated in accordance with this deviation. FIG. 8 indicates this deviation.

When the hydraulic pressure $P$ (the roll bending force) is applied to the equivalent spring unit of FIG. 7, the spring unit of FIG. 7 will be led to keep their balance of the forces in such a state as illustrated in FIG. 8. This balance may be expressed as follows:

$$Q = P' = F'. \quad (X)$$

The relation of displacement value among springs, then, becomes:

$$H + M = 2R. \quad (XI)$$

where,
$H$ represents the displacement value of spring $KH$;
$R$, the displacement value of spring $KR$; and
$M$, the displacement value of spring $KM$.

Spring KR receives the force P from the outside, and at the same time, gives the force P' to the outside. The above force P' may be shown as follows:

$$P' = P - KR R. \quad (XII)$$

And, the following expression is, from (X) obtained.

$$Q = P - KR \cdot R \quad (XIII)$$

While, $$Q = KH. H \quad H = Q/KH \quad (XIV)$$

$$F' = Q = KM. M \quad M = Q/KM. \quad (XV)$$

The rearranged (XIII) then becomes:

$$R = P - Q/KR \quad (XIII')$$

Then, substituting the above (XIV), (XV) and (XIII') for (XI), it is rewritten in the following form;

$$Q/KH + Q/KM = 2/KR (P - Q) \quad (XVI)$$

From equation (XVI), the required proportional constant $k$ then becomes:

$$k = 2KM.KH/KH.KR + KR.KM + 2KM.KH \quad (XVII)$$

It becomes apparent from the above detailed description that for any given system, the constant $k$ with reference to the force signals, i.e., forces $P$ and $Q$, is easily calculated.

$KH$ corresponds to the elongation of the housing for the rolling mill and is a value to be calculated by taking into account such factors as elongation of pillers (FIG. 9A), as well as deviation of roll screw down, bending of back up roll and deformation of bearing box. KR corresponds to the flatness of the roll and shows the deviation in the distance between center of two rolls that results from the flattening of the rolls between work rolls and back up rolls. The deviation of the distance between centers of two rolls is in proportion to bending force $P$. $KM$ is the spring constant corresponding to the deviation in thickness of the material being worked. It is not truly constant, but since the differences are minute, it may be effectively regarded as a constant.

There is, hereinafter, shown an actual operating example:

rolling mill: 80 in. hot strip mill
workpiece: plane carbon steel
width, 1,800 mm
finishing thickness, 3 mm
rolling temperature, 900° C
spring constant (approximation value)
$KH$, $6.34 \times 10^6$ kg/cm
$KR$, $71.5 \times 10^6$ kg/cm
$KM$, $1.0 \times 10^6$ kg/cm If the above values are applied to equation (IX) above, the proportional constant $k$ is as follows:
backup roll bending, 1/1.15
work roll bending, 1/42.2

From the above it should be apparent that the spring constants KH and KR may be regarded as a stated number insofar as the housing and rolls are constant. KM varies with the size, property or temperature of the workpiece. Therefore, $KM$ in such a case when the workpiece width is halved, i.e., 900 mm, is calculated, so that its value becomes $0.5 \times 10^6$ kg/cm. Accordingly, the obtained proportional constant k is as follows:
backup roll bending, 1/1.07
work roll bending, 1/7.81

The above examples have important meaning. It is necessary that the above $k$ value should be exactly calculated every time the rolling schedule is changed and be in the memory of said converter 7 before actual operations begin. Such proceedings may be, of course, performed every time it is required by previously mentioned means. It will be, however, preferable to perform the required calculations and entry thereof into memory by means of an electronic computer.

The signal representing the real rolling force value may be easily obtained by the previously described networks including both converting said $P$ value of force into subtractive polarity electrical signal $q$ and adding said converted $P$ signal to the electrical signal from sensor 5 which includes a component $q$ corresponding to force Q. Thus, the resulting signal, after adding signals $(p+q)$ and $(-q)$, representing the real rolling force value is utilized to drive the amplifier 8 to cause the automatic shape and thickness control system to properly control the rolling operation without causing erroneous variations in the thickness of the strip.

FIG. 10 shows the present invention embodied in an overall control system for controlling the shape of a workpiece. FIG. 10 is shown in block diagram form and the particular design of each element thereof should be apparent to one ordinarily skilled in the art in view of the above discussion of the invention. Elements common to FIG. 10 and to the previous figures are given the same reference numerals for ease of description. A discussion of the operation of the embodiment of FIG. 10 up to the summing point 10 should be apparent and is not described in detail herein. The output of summing point 10 is an electrical signal corresponding to the actual rolling force F applied to the workpiece. A reference signal $f_0$ is applied to the reference input terminal of summing point 11. The reference input signal $f_0$ corresponds to a predetermined desired value of rolling force $F_0$ which is desired to be maintained to produce the strip having desired characteristics. A signal $\Delta f$ is generated at the output of the summing point 11 which is equivalent to the difference between signals $f_0$ and $f$. The signal $\Delta f$ is an actuating signal which is applied to a control device 12 which converts the signal $\Delta f$ to a force signal $\Delta F$. The force signal $\Delta F$ is then fed to the rolling mill components in order to vary the actual rolling force in accordance with the desired rolling force. For example, if the actual rolling force applied to the strip is too little, the signal $\Delta f$ would be of such a polarity so as to cause the force signal $\Delta F$ to increase the rolling force $F$ applied to the workpiece. The operation of such a system should be apparent to one skilled in the art in view of the discussions contained herein.

Although the present invention has been described with a certain degree of particularity, it should be understood that the present disclosure has been made only by way of example and that numerous changes in the details of construction and arrangement of the parts may be resorted to without departing from the scope and spirit of the present invention. For example the method of workpiece strip shape control taught by this specification can be accomplished by adding hydraulic pressure only between the work rolls except for the position given by the present invention. The calculation of said $P$ and $Q$ values may be easily carried out along the lines of the above described example. This method also will properly and effectively perform the required control.

I claim:

1. A method of controlling the shape and thickness of a workpiece passing between the rolls of a rolling mill, said rolling mill having work rolls, backup rolls, means for applying a rolling force to said backup rolls, means for applying a bending pressure to said rolls, means for sensing the value of said bending pressure and means for sensing the total force applied on said backup rolls, comprising the steps of:

generating a first electrical signal $(f + q)$ representative of the total force applied on said backup rolls, said first signal containing a signal component representative of the reaction force applied by said bending pressure means;

generating a second electrical signal $(p)$ representative of said bending pressure applied to said rolls;

pre-determining and storing a single constant value $(k)$ corresponding to the relationship between said bending pressure and the physical characteristics of the rolling mill, of the material being worked, and the rolling conditions;

generating a third electrical signal $(q)$ as a product of said single predetermined constant and said second signal so that said third signal has a value so as to cancel said signal component of said first signal; and combining said first and third signals to cancel said signal component and to provide a control signal $(f)$ representing the actual applied rolling force for varying the rolling force on said rolls to control the shape and thickness of said workpiece.

2. The method of claim 1 wherein said combining step includes subtracting said third signal $(q)$ from said first signal $(f+q)$ to provide said control signal $(f)$.

3. The method of claim 1 wherein said bending pressure is applied between the backup rolls.

4. The method of claim 1 wherein said bending pressure is applied between a backup roll and a work roll.

5. The method of claim 1 wherein said bending pressure is applied between work rolls.

6. The method of claim 1 wherein said single constant value $(k)$ is determined as a function of the following constants;

KH which corresponds to the elongation of the housing for the rolling mill;

KR which corresponds to the flatness of the rolls; and

KM which is a spring constant corresponding to the deviation in thickness of the workpiece.

7. The method of claim 6 wherein said constant KH is determined as a function of the elongation of the pillers of the rolling mill, the deviation of the roll screw down, the bending of the backup roll and the deformation of the bearing box of said rolling mill.

* * * * *